United States Patent [19]

Wiig

[11] 4,438,891

[45] Mar. 27, 1984

[54] TAPE TRANSPORT SYSTEM

[75] Inventor: Selmer L. Wiig, Plainfield, N.J.

[73] Assignee: Lockheed Electronics Company, Inc., Plainfield, N.J.

[21] Appl. No.: 266,658

[22] Filed: May 26, 1981

[51] Int. Cl.³ .................... B65H 59/04; G11B 15/32; G11B 15/28
[52] U.S. Cl. ................................ 242/190; 242/193
[58] Field of Search .............. 242/186, 187, 189, 201, 242/75, 193, 190, 203, 202; 226/41

[56] References Cited

U.S. PATENT DOCUMENTS

| | | | |
|---|---|---|---|
| 2,954,939 | 10/1960 | Herrmann | 242/203 X |
| 3,032,286 | 5/1962 | Herrmann | 242/203 X |
| 3,248,066 | 4/1966 | Andrews | 242/190 X |
| 3,465,357 | 9/1969 | Anderson | 242/202 X |
| 3,718,289 | 2/1973 | Alaimo | 242/190 |
| 4,030,131 | 6/1977 | Beiter et al. | 242/190 X |
| 4,104,685 | 8/1978 | Chang | 242/190 X |
| 4,145,016 | 3/1979 | Wiig | 242/193 |

FOREIGN PATENT DOCUMENTS 601715 2/1960 Italy .................................. 242/190

Primary Examiner—Stuart S. Levy
Assistant Examiner—Scott J. Haugland
Attorney, Agent, or Firm—Hopgood, Calimafde, Kalil, Blaustein & Judlowe

[57] ABSTRACT

A capstan driven web system having a take-up reel and a supply reel, the tape being drawn from the supply reel by a tape driven capstan arrangement. The drawn tape is collected on the take-up reel which is mechanically coupled to the supply reel by a mechanism having variable transfer ratio. In one embodiment, the variable ratio transport system is formed of a belt drive system having variable diameter pulleys coupled to each of the tape reels. The transfer ratio of the variable diameter pulley system is controlled by a servo mechanism which selects an appropriate transfer ratio in response to the position of a servo arm which senses the tension of the tape.

5 Claims, 3 Drawing Figures

TAPE TRANSPORT SYSTEM

BACKGROUND OF THE INVENTION

1. Field of the Invention

The invention relates generally to a tape transport system, and more particularly, to a tape tensioning system which controls the relative rate of rotation of tape take-up and supply reels over a predetermined range of speed ratios, the speed ratios being selected by a servo-control system in response to tape tension.

2. Prior Art

In known web or tape transport systems, there exists a need for improved precision in the control of tape tension at the recording and playback head. Servo-control motors have been used to drive each tape reel in an effort to more precisely control the speed and tension of the tape; while a third motor arrangement is used in a capstan system to drive the tape. Although such three-motor systems have performed well, they are very inefficient in terms of electrical energy utilization. In fact, 90 percent of the overall electrical input energy is wasted as heat. In addition to such inefficiency, motor driven systems are complex, expensive, heavy, and cause thermal problems in certain applications.

In capstan driven systems, negator springs have been used to provide for the differential motion between supply and take-up reels. A good example of a negator spring tension apparatus is described in my previous U.S. Pat. No. 4,145,016 issued on Mar. 20, 1979 and assigned to the assignee hereof. Negator spring transports are useful to help achieve the precise control required with high-density recordings, however, such systems are heavy, and tape tension must be equalized by the use of complicated and expensive magnetic brakes or their equivalents.

The foregoing problems are particularly acute in aircraft and space applications where reliability and weight are important considerations. Moreover, such highly demanding applications require large diameter tape reels to be used with relatively large tape widths to permit substantial data to be accumulated, but only small amounts of electrical power are available.

It is, therefore, an object of this invention to provide a system which precisely controls the tension of a tape or web between a capstan tape drive arrangement and a take-up reel.

It is another object of this invention to provide a tape control system which operates at substantially reduced power consumption levels over conventional reel drive arrangements.

It is a still further object of the invention to provide a light-weight, affordable system which can handle large reels, of the type which can hold up to 12,000 feet of tape at a width of up to 2 inches, such reels being readily exchangeable.

It is yet another object of this invention to provide a tape tension control system wherein the tension is not dependent upon the speed of the tape, and total electrical input power is reduced by eliminating the need for brakes at the reel hubs.

SUMMARY OF THE INVENTION

The foregoing and other objects are achieved by this invention which provides a tension control system for a tape transport arrangement. A first reel with tape wound thereon supplies tape to a tape drive mechanism. Drawing of the tape from the first reel by the tape drive mechanism causes the first reel to rotate, while the tape which is expelled by the tape drive mechanism is collected on a take-up reel. Each of the tape reels is mechanically coupled to a respective shaft so that the shafts rotate in synchronism with their respective tape reels. In a preferred embodiment, tension in the tape between the tape drive mechanism and the take-up reel is monitored by a tension sensor which produces a tape tension signal in response to deviations from a predetermined tape tension force. The shafts from the reels are coupled to one another by a variable ratio coupling system whereby the rotation of one shaft is coupled to the other. The shafts rotate at respective relative speeds, such speeds having a relationship which corresponds to the radius of tape wound on the respective reels. Thus, the speeds of the shafts are selectable over a predetermined range of speed ratios, the speed ratio varying continuously as tape is transferred between the reels. The appropriate instantaneous speed ratio is selected by a servo mechanism in response to the tension of the tape between the tape drive mechanism and the take-up reel.

In one embodiment of the invention, the tension of the tape between the tape drive mechanism and the take-up reel is monitored by a servo arm which is displaced in response to the tension of the tape. Circuitry is provided for converting the tension-responsive displacement of the servo arm to a corresponding electrical signal.

Each of the shafts is provided with a variable diameter pulley, each formed of a pair of pulley halves. The first and second pulley halves on each shaft are arranged coaxially, in a manner which permits them to be separated by an advantageously adjustable coaxial distance. A drive belt, of the type having first and second friction surfaces for simultaneously engaging with the pulley halves on each shaft, is provided as a coupling member. The advantageous variation in the coaxial distance between the pulley halves causes corresponding changes in the effective diameter of each pulley. In a preferred embodiment, the pulleys are arranged so that their respective pulley operates inversely to the other. Thus, as the pulley halves in one pulley are separated, so as to permit the drive belt to be located at a shorter radius, the pulley halves in the other pulley are brought closer together so as to cause the belt to be located at a larger radius on that pulley. The distances between the pulley halves are controlled by a servo mechanism which is responsive to the signal produced by the tape tension sensor.

BRIEF DESCRIPTION OF THE DRAWINGS

Comprehension of the invention is facilitated by reading the following detailed description in conjunction with the annexed drawings, in which.

DETAILED DESCRIPTION

Figure 1:
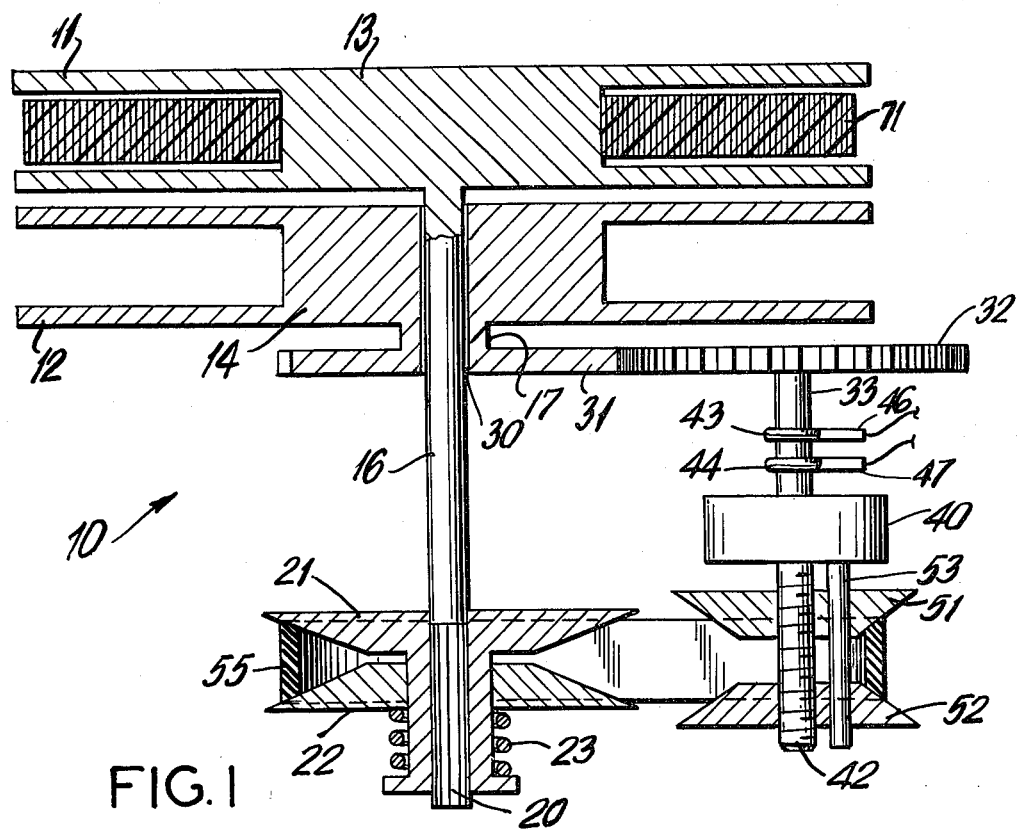
FIG. 1 is a cross-sectional side view of a tape tensioning system according to the invention.

FIG. 1 shows a cross-sectional view of an illustrative embodiment of the inventive web transport system. A supply reel 11 and a take-up reel 12 are stacked coaxially, as shown. Reels 11 and 12 are provided with respective hub portions 13 and 14 which are coupled to respective shafts 16 and 17.

As shown, shaft 16 may be substantially in the form of a cylindrical solid, and provided with a spline portion 20. A pair of pulley halves, 21 and 22, are mounted on spline portion 20 of shaft 16 so as to rotate with the shaft as reel 11 is rotated in response to the drawing of the tape by a capstan tape drive mechanism (not shown in this figure).

Shaft 17, which is coupled to reel 12, is provided with a coaxial, central opening 30 through which shaft 16 is arranged. A gear 31 is coaxially affixed to shaft 17, so as to rotate with reel 12. Gear 31 is enmeshed with a further gear 32 which is concentrically coupled to a shaft 33. Gears 31 and 32 may be of the helical type, and, in this embodiment, may provide a $-1:1$ gear ratio. Thus, shaft 33 rotates at the same rotational speed as take-up reel 12, but in the opposite rotational direction.

Shaft 33 is mechanically coupled to a housing of a servo motor 40. Servo motor 40 is provided with a screw threaded armature shaft 42, which rotates with respect to the housing of servo motor 40 in response to the application of electrical signals at slip rings 43 and 44 which are in electrical communication with respective electrical contact members 46 and 47.

Screw threaded armature shaft 42 is provided with a pair of coaxially arranged pulley halves 51 and 52. Pulley halves 51 and 52 are constrained to rotate with the housing of servo motor 40 by a key 53 which permits pulley halves 51 and 52 to move with respect to one another on the longitudinal axis of screw threaded armature shaft 42, but locks the pulley halves so as to rotate synchronously with the servo motor housing, and consequently with tape reel 12. The application of electrical signals, the nature and origin of which will be described hereinbelow, to contact members 46 and 47 causes screw threaded armature shaft 42 to rotate so as to responsively vary the amount of separation between pulley halves 51 and 52.

The pulley halves on screw threaded shaft 42 are coupled to the pulley halves on shaft 16 by a belt 55 having a fixed loop length. Belt 55 transfers rotational motion between respective pairs of pulley halves in accordance with a variable transfer ratio. The application of an appropriate signal at electrical contact members 46 and 47 rotates shaft 42 in a direction which causes pulley halves 51 and 52 to separate coaxially, as shown. This separation permits belt 55 to be moved radially inward towards screw threaded shaft 42, so as to effectively reduce the diameter of pulley halves 51 and 52. A spring 23, which urges pulley halves 21 and 22 axially toward each other, causes the slack in belt 55, which results from the inward motion of the belt along pulley halves 51 and 52, to be taken up by pulley halves 21 and 22. Thus, as the effective diameter of pulley halves 51 and 52 is reduced, the effective diameter of pulley halves 21 and 22 is increased.

If the electrical signals at contact members 46 and 47 are reversed in polarity, screw threaded armature shaft 42 will rotate in an opposite direction so as to cause pulley halves 51 and 52 to move axially closer to one another. This causes belt 55 to be moved radially outward from screw threaded shaft 42, thereby increasing the effective radius of pulley halves 51 and 52, with respect to the axis of rotation of screw threaded armature shaft 42. As belt 55 is urged outward along pulley halves 21 and 22, by the bringing together of the pulley halves, the belt is caused to be moved radially inward on pulley halves 21 and 22, so as to be disposed at a shorter radius with respect to the longitudinal axis of shaft 16.

It becomes apparent, therefore, that the ratio of effective diameters between the diameter of pulley halves 51 and 52 and pulley halves 21 and 22, may be advantageously adjusted by the application of appropriate electrical signals at contact members 46 and 47 so as to rotate screw threaded armature shaft 42 in a predetermined direction, and thereby adjust the distance between pulley halves 51 and 52. It should be noted, therefore, that in this embodiment of the invention, the ratio of pulley diameters varies exponentially with the distance between pulley halves 51 and 52. This results from the fact that the axial motion between pulley halves 51 and 52 causes variation in the effective diameters of all of the pulley halves. As the effective diameter of one pair of pulley halves is increased, the effective diameter of the other pair is decreased, and vice versa. Thus, in an embodiment of the invention wherein the pulley halves have frictional surfaces which slope linearly with respect to pulley radius, in the form of truncated cones which are arranged coaxially inverted with respect to one another so as to produce two predetermined frictional surface angles therebetween, the variations in the ratio of pulley diameters varies exponentially with variation in the coaxial distance between pulley halves 51 and 52.

Figure 2:
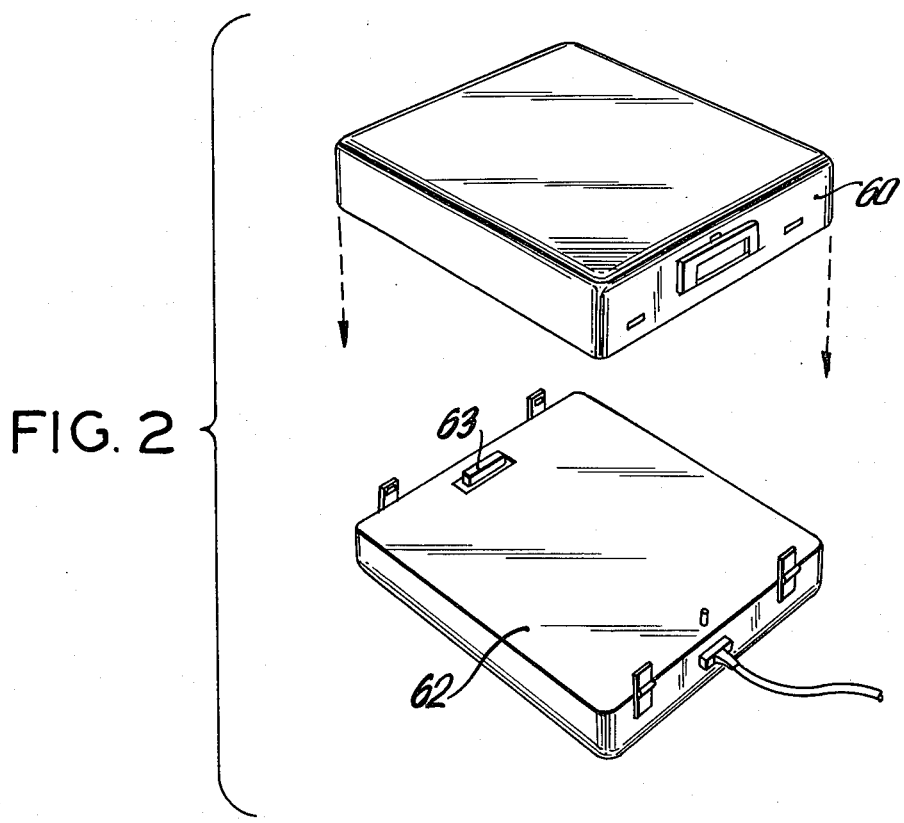
FIG. 2 shows a tape cartridge module and a mating electronics module, in accordance with a specific illustrative embodiment of the invention.

FIG. 2 shows an embodiment of the invention which is particularly suited for aeronautic and space applications. Illustratively, tape reels 11 and 12 (not shown in this figure) may be mounted in an hermetically sealed cartridge 60 which mates with an electronics module 62 via innerface connector 63. Such modularization permits simple and fool-proof replacement of the tape reels, without necessarily replacing the electronic circuitry (not shown) which is contained in electronics module 62. In addition, the use of sealed tape transport module 60 and sealed electronics module 62 reduces the size and weight of the tape recorder system and facilitates the retrieval of stored data. The sealed cartridge also prevents contamination of the tape and inadvertent incorrect assembly of the tape reels in the recorder.

Figure 3:
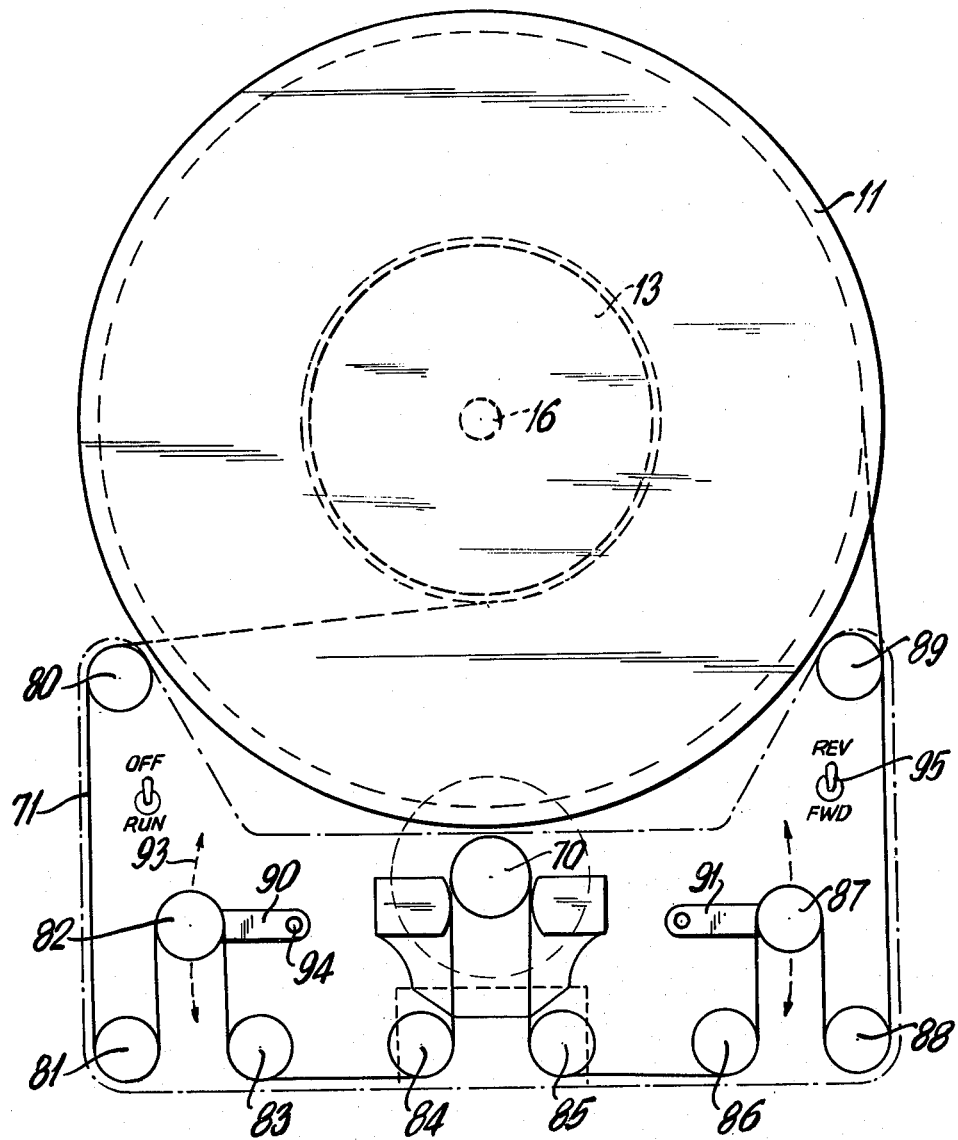
FIG. 3 is an internal plan view of the upper side of the tape cartridge shown in FIG. 2.

Referring to FIG. 3, single-wrap capstan 70, which is rotated by a motor drive mechanism (not shown), provides drive to tape 71. Tape 71 is drawn from supply reel 11 by capstan 70 along a path which includes a plurality of guide rollers 80 to 89. In a preferred embodiment, tape 71 is one inch wide, contains 42 information tracks, and is over 5,000 feet long. Although the inventive system can be used with tape which is less than one inch in width, the system is better suited for applications utilizing large scale tape, wherein lightweight, low-power draw, and reliability, are desirable.

In a further embodiment, capstan 70 provides sufficient torque to drive tape 71 having tape width up to two inches. A two inch diameter capstan can provide tape speeds of up to 100 inches per second (I.P.S.) with a relatively low-power motor. The system can, however, operate at speeds between 1 I.P.S. to 480 I.P.S. without a separate reel drive arrangement. Furthermore, power consumption at 60 I.P.S. is approximately 10 Watts.

Tape tensioning system 10 operates to control the relative speeds of supply reel 11 and take-up reel 12. Initially, take-up reel 12 is rotating at a higher velocity than supply reel 11. The speed differential between the reels, however, is continually varying in accordance with the relative amounts of tape wound on each. For this reason, tape tension sensing arms, 90 and 91, are located in the tape path between capstan 70 and reels 11 and 12. In a first direction of operation, tape 71 is drawn from supply reel 11 to take-up reel 12, the servo motor 40 adjusts the diameter ratios of pulley halves 21 and 22, and 51 and 52, so as to match the ratio of the tape diameters on respective reels 11 and 12. When such correspondence between the pulley diameters and the tape diameter on the reels is achieved, reel 12 takes up the tape which is drawn by capstan 70 from the reel 11 at precisely the same speed at which capstan 70 is operating so as to cause tension servo arm 90, which is movable over an arc defined by the arcuate arrow 93 over guide roller 82, to remain in a predetermined null position, as shown.

Servo arm 90, as noted, moves in an arcuate path 93, the servo arm being rotatable about a stationary hinge point 94. The servo arm is urged upwardly by a spring mechanism (not shown), so that if tape 71 were not arranged around guide roller 82, the servo arm 90 would be maintained in a position whereby guide roller 82 is moved away from guide rollers 81 and 83. In situations where take-up reel 12 is rotating at a relatively slow speed so that slack is being created in tape 71 between capstan 70 and reel 12, such slack would cause servo arm 90 to move upward by action of the above mentioned spring mechanism. Servo arm 90 is coupled to an electric servo circuit (not shown) which conducts a corresponding electrical signal to contact members 46 and 47 of FIG. 1. In this embodiment, such a signal which is produced by the upper movement of servo arm 90 will cause pulley halves 51 and 52 to be coaxially more separated from one another so that belt 55 moves inward closer to screw threaded shaft 42. This inward motion of belt 55 along pulley halves 51 and 52 is accompanied by a corresponding outward motion of belt 55 along pulley halves 21 and 22, resulting in reel 12 being rotated slightly faster. Such an increase in the rotation speed of reel 12 causes the slack in tape 71 to be taken up, thereby causing servo arm 90 to be moved downward along arcuate path 93 by the increasing tape tension. If reel 12 now moves too rapidly so that an excessive tension force is produced in tape 71, resulting in servo arm 90 being moved downward beyond its predetermined null position, the polarity of the signals at contact points 46 and 47 is reversed, thereby causing servo motor 40 to bring pulley halves 51 and 52 closer together. This causes take-up reel 12 to be slowed somewhat thereby relieving some of the tension on tape 71, and permitting servo arm 90 to be moved towards its null position. In this manner, the tension on tape 71 is carefully controlled so that servo arm 90 is maintained at a null position.

In a reversible embodiment of the inventive tape transport system, a reverse-forward switch 95 is provided which controls the direction of tape motion. Reversal of the tape direction by actuation of switch 95 causes reel 11 to become the take-up reel, and reel 12 to become the feed reel. In addition, the control of the tension on tape 71 is transferred to a servo arm 91 which operates in the manner described above with respect to servo arm 90.

It is to be understood that the above-described arrangement is merely illustrative of the many possible specific embodiments which can be devised to represent application of the principles of the invention. Numerous and varied other arrangement can be devised in accordance with these principles by those skilled in the art without departing from the spirit and scope of the invention. In particular, it should be noted that the servo circuitry associated with the servo arms could be configured in the form of a microswitch, or it could be designed as an optical system, by persons skilled in the art, in light of this teaching. Furthermore, the tensioning apparatus can be adapted for smaller scale devices, and the tape transport system need not be fabricated as a modular system as shown in FIG. 3. Also, the tape transport arrangement may be arranged with the tape reels in a conventional side-by-side arrangement, rather than the stacked arrangement described herein.

What is claimed is:

1. A tension control system for a tape transport arrangement of the type wherein a first reel having tape wound thereon supplies tape which is drawn therefrom by a tape drive mechanism, the drawn tape being collected on a second reel, the first and second reels being mechanically coupled to first and second shafts, respectively, said second shaft having first and second independently rotatable portions, the first portion of said second shaft being coupled to said second reel, the tension control system comprising:

tension sensing means for detecting a tensile force in the tape as it is collected onto the second reel and providing a tape tension signal which corresponds to said tensile force;

first and second variable ratio coupling members for rotatively coupling the first and second shafts to one another, whereby rotation of the first shaft is coupled to the second shaft to rotate the second shaft at a rate of rotation corresponding to the selected ratio with respect to a rate of rotation of the first shaft, said selected ratio of said rate of rotation of the first and second shafts being selectable within a predetermined range of ratios; said variable ratio coupling members comprising flexible drive transmission means for mechanically interconnecting said first and second coupling members, said first and second variable coupling members each comprising first and second pulley halves, each said pulley half having a central axis of rotation and a respective friction surface for engaging said flexible drive transmission means, said first and second pulley halves being coaxially movably arranged with respect to one another along said central axis of rotation; and servo motor means responsive to said tape tension signal from said tension sensing means, said servo motor means being coupled between said first and second portions of said second shaft to provide relative rotation between said first and second portions of said second shaft, said second portion of said second shaft being coupled to said second variable coupling member for producing said relative coaxial displacement between said first and second pulley halves, thereby to select said selected ratio of said rate of rotation of the first and second shafts.

2. The tension control system of claim 1 wherein said tension sensing means comprises:

tension displacement means for producing a displacement in response to said tensile force, said displacement occurring in a first direction when said tensile force exceeds said predetermined tape tension force, in a second direction when said tensile force is less than said predetermined tape tension force, said tension displacement means having predetermined null position corresponding to said predetermined tape tension force; and tension signal means for producing said tape tension signal in response to said displacement and predetermined null position of said tension displacement means.

3. The tension control system as claimed in claim 1 wherein at least one of said first and second variable coupling members includes means for biasing said first and second pulley halves together to thereby accommodate said flexible drive transmission means as said other variable coupling member is displaced by said servo motor means.

4. The tension control system of claim 1 wherein said friction surfaces of said first and second pulley halves are arranged each substantially in the form of truncated cones so as to form therebetween a predetermined friction surface engagement angle for engaging said flexibe drive transmission means, said predetermined friction surface engagement angle having an apex disposed between said first and second pulley halves at a radius with respect to said central axis of rotation which varies in response to variations in said coaxial separation between said first and second pulley halves.

5. The tension control system of claim 4 wherein said flexible drive transmission means comprises a drive transmission belt having first and second belt device surfaces arranged at an angle with respect to one another which corresponds to said predetermined friction surface engagement surface angle.

* * * * *

UNITED STATES PATENT AND TRADEMARK OFFICE
CERTIFICATE OF CORRECTION

PATENT NO. : 4,438,891
DATED : March 27, 1984
INVENTOR(S) : Selmer L. Wiig

It is certified that error appears in the above-identified patent and that said Letters Patent are hereby corrected as shown below:

IN THE CLAIMS

Claim 5, line 3, "device" should read

-- drive --.

Signed and Sealed this

Eighteenth Day of September 1984

[SEAL]

Attest:

GERALD J. MOSSINGHOFF

Attesting Officer         Commissioner of Patents and Trademarks